United States Patent
Lee et al.

(10) Patent No.: US 9,094,115 B2
(45) Date of Patent: *Jul. 28, 2015

(54) ANTENNA SYSTEM AND METHOD FOR MITIGATING MULTI-PATH EFFECT

(71) Applicant: AGC Automotive Americas R&D, Inc., Ypsilanti, MI (US)

(72) Inventors: Ming Lee, Ypsilanti, MI (US); Wladimiro Villarroel, Ypsilanti, MI (US); Yasutaka Horiki, Ypsilanti, MI (US); Kwan-ho Lee, Ann Arbor, MI (US)

(73) Assignee: AGC AUTOMOTIVE AMERICAS R&D, INC., Ypsilanti, MI (US)

( * ) Notice: Subject to any disclaimer, the term of this patent is extended or adjusted under 35 U.S.C. 154(b) by 189 days.

This patent is subject to a terminal disclaimer.

(21) Appl. No.: 13/933,605

(22) Filed: Jul. 2, 2013

(65) Prior Publication Data

US 2013/0295864 A1    Nov. 7, 2013

Related U.S. Application Data

(63) Continuation of application No. 12/815,833, filed on Jun. 15, 2010, now Pat. No. 8,515,378.

(60) Provisional application No. 61/268,662, filed on Jun. 15, 2009, provisional application No. 61/268,663, (Continued)

(51) Int. Cl.
*H04B 17/00* (2015.01)
*H01Q 1/12* (2006.01)
(Continued)

(52) U.S. Cl.
CPC ......... *H04B 17/0055* (2013.01); *H01Q 1/1271* (2013.01); *H01Q 1/325* (2013.01);
(Continued)

(58) Field of Classification Search
CPC .......... H04B 7/10; H04B 7/0413; H04B 1/44; H04B 1/0053; H04B 1/18; H04B 7/0894; H04B 17/12; H04B 1/0064; H04B 1/0458; H04B 7/01; H04B 7/0617; H04B 7/0667; H04B 7/0671; H04B 7/0682; H01Q 3/26; H01Q 3/36; H01Q 3/2605; H01Q 3/34; H01Q 15/242; H01Q 21/00; H01Q 25/00; H01Q 3/2694; H01Q 3/30; H01Q 3/40; H01Q 1/246; H01Q 3/267; H01Q 3/42; H01Q 1/125; H01Q 1/1257
See application file for complete search history.

(56) References Cited

U.S. PATENT DOCUMENTS 3,177,489 A    4/1965    Saltzberg
3,359,555 A    12/1967    Taylor
(Continued)

FOREIGN PATENT DOCUMENTS

EP    1032073 A2    8/2000
EP    1091447 A1    4/2001
(Continued)

OTHER PUBLICATIONS

English language abstract and machine-assisted English translation for JP 2004-328357 extracted from the PAJ database on Sep. 10, 2014, 36 pages.

(Continued)

*Primary Examiner* — Lana N Le
(74) *Attorney, Agent, or Firm* — Howard & Howard Attorneys PLLC

(57) ABSTRACT

An antenna system and method utilize a splitter electrically connectable to a single antenna for splitting an RF signal into two signals. A variable phase shifter shifts the phase of one of the signals. A combiner combines the phase shifted and non-phase shifted signals to produce a conditioned signal. A quality examiner circuit changes the amount of phase shift provided by the variable phase shifter to produce a plurality of different conditioned signals. The quality examiner circuit then determines a quality of each conditioned signal and changes the phase shift again to provide the highest quality conditioned signal to a receiver.

15 Claims, 3 Drawing Sheets

Related U.S. Application Data filed on Jun. 15, 2009, provisional application No. 61/268,665, filed on Jun. 15, 2009, provisional application No. 61/268,673, filed on Jun. 15, 2009, provisional application No. 61/268,674, filed on Jun. 15, 2009, provisional application No. 61/268,689, filed on Jun. 15, 2009.

(51) Int. Cl.
| | |
|---|---|
| *H01Q 1/32* | (2006.01) |
| *H01Q 3/26* | (2006.01) |
| *H01Q 3/34* | (2006.01) |
| *H04B 7/00* | (2006.01) |
| *H04B 7/08* | (2006.01) |
| *H04B 7/10* | (2006.01) |
| *H04B 17/345* | (2015.01) |

(52) U.S. Cl.
CPC .............. *H01Q 3/2605* (2013.01); *H01Q 3/34* (2013.01); *H04B 7/002* (2013.01); *H04B 7/086* (2013.01); *H04B 7/0848* (2013.01); *H04B 7/0857* (2013.01); *H04B 7/10* (2013.01); *H04B 17/345* (2015.01)

(56) References Cited

U.S. PATENT DOCUMENTS

| | | | |
|---|---|---|---|
| 3,603,886 A | 9/1971 | Norrs | |
| 3,670,335 A | 6/1972 | Hirsch | |
| 3,870,996 A | 3/1975 | Miller | |
| 3,964,065 A | 6/1976 | Roberts et al. | |
| 4,051,474 A | 9/1977 | Mack et al. | |
| 4,057,803 A | 11/1977 | Coleman | |
| 4,085,368 A | 4/1978 | Yeh | |
| 4,103,304 A | 7/1978 | Burnham et al. | |
| 4,189,733 A | 2/1980 | Malm | |
| 4,220,954 A | 9/1980 | Marchand | |
| 4,225,870 A | 9/1980 | Marner et al. | |
| 4,280,128 A | 7/1981 | Masak | |
| 4,298,873 A | 11/1981 | Roberts | |
| 4,308,541 A | 12/1981 | Seidel et al. | |
| 4,313,116 A | 1/1982 | Powell et al. | |
| 4,408,205 A | 10/1983 | Hockham | |
| 4,584,581 A | 4/1986 | Teshirogi | |
| 4,704,724 A | 11/1987 | Krishnan et al. | |
| 4,704,734 A | 11/1987 | Menich et al. | |
| 4,803,492 A | 2/1989 | Inaba et al. | |
| 4,814,777 A | 3/1989 | Monser | |
| 4,821,039 A | 4/1989 | Crane | |
| 4,849,992 A | 7/1989 | Alderman et al. | |
| 5,068,668 A | 11/1991 | Tsuda et al. | |
| 5,107,273 A | 4/1992 | Roberts | |
| 5,117,236 A | 5/1992 | Chang et al. | |
| 5,317,288 A | 5/1994 | Yung et al. | |
| 5,377,035 A | 12/1994 | Wang et al. | |
| 5,515,059 A | 5/1996 | How et al. | |
| 5,517,686 A | 5/1996 | Kennedy et al. | |
| 5,568,158 A | 10/1996 | Gould | |
| 5,600,333 A | 2/1997 | Justice et al. | |
| 5,603,107 A | 2/1997 | Gottfried et al. | |
| 5,710,995 A | 1/1998 | Akaiwa et al. | |
| 5,760,740 A * | 6/1998 | Blodgett ..................... | 342/362 |
| 5,818,385 A | 10/1998 | Bartholomew | |
| 5,898,405 A | 4/1999 | Iwasaki | |
| 5,909,191 A | 6/1999 | Hirshfield et al. | |
| 5,999,138 A | 12/1999 | Ponce de Leon | |
| 6,002,672 A | 12/1999 | Todd | |
| 6,018,315 A | 1/2000 | Ince et al. | |
| 6,064,865 A | 5/2000 | Kuo et al. | |
| 6,087,986 A | 7/2000 | Shoki et al. | |
| 6,121,925 A | 9/2000 | Hilliard | |
| 6,125,109 A | 9/2000 | Fuerter | |
| 6,144,339 A | 11/2000 | Matsumoto et al. | |
| 6,172,970 B1 | 1/2001 | Ling et al. | |
| 6,175,723 B1 | 1/2001 | Rothwell, III | |
| 6,229,840 B1 | 5/2001 | Ichihara | |
| 6,236,839 B1 | 5/2001 | Gu et al. | |
| 6,271,798 B1 | 8/2001 | Endo et al. | |
| 6,278,415 B1 | 8/2001 | Matsuyoshi et al. | |
| 6,313,807 B1 | 11/2001 | Kolak | |
| 6,314,127 B1 | 11/2001 | Lynch et al. | |
| 6,369,756 B1 | 4/2002 | Wang et al. | |
| 6,388,621 B1 | 5/2002 | Lynch | |
| 6,414,624 B2 | 7/2002 | Endo et al. | |
| 6,449,469 B1 | 9/2002 | Miyahara | |
| 6,456,257 B1 | 9/2002 | Zamat | |
| 6,470,186 B1 | 10/2002 | Whikechart et al. | |
| 6,480,526 B1 | 11/2002 | Shoki et al. | |
| 6,486,828 B1 | 11/2002 | Cahn et al. | |
| 6,535,168 B1 | 3/2003 | Marumoto et al. | |
| 6,559,798 B1 | 5/2003 | Marumoto et al. | |
| 6,563,860 B2 | 5/2003 | Schilling | |
| 6,577,353 B1 | 6/2003 | Welles, II et al. | |
| 6,646,614 B2 | 11/2003 | Killen | |
| 6,661,386 B1 | 12/2003 | Petros et al. | |
| 6,731,940 B1 | 5/2004 | Nagendran | |
| 6,768,457 B2 | 7/2004 | Lindenmeier | |
| 6,816,116 B2 | 11/2004 | Chen | |
| 6,831,611 B2 | 12/2004 | Ooe et al. | |
| 6,867,739 B2 | 3/2005 | Prassmayer et al. | |
| 6,885,349 B2 | 4/2005 | Hickel | |
| 6,925,293 B2 | 8/2005 | Lindenmeier et al. | |
| 6,952,587 B2 | 10/2005 | Whikehart et al. | |
| 6,959,175 B2 | 10/2005 | Ohtaki | |
| 6,973,138 B1 | 12/2005 | Wright | |
| 6,977,611 B1 | 12/2005 | Crabb | |
| 7,015,861 B2 | 3/2006 | Boyd et al. | |
| 7,016,399 B1 | 3/2006 | Vadgama et al. | |
| 7,075,485 B2 | 7/2006 | Song et al. | |
| 7,088,104 B2 | 8/2006 | Bottomley | |
| 7,099,415 B2 | 8/2006 | Ohsawa | |
| 7,099,644 B2 | 8/2006 | Whikehart et al. | |
| 7,113,748 B2 | 9/2006 | Shapira et al. | |
| 7,119,751 B2 | 10/2006 | Li et al. | |
| 7,126,553 B1 | 10/2006 | Fink et al. | |
| 7,149,480 B2 | 12/2006 | Miyahara | |
| 7,170,465 B2 | 1/2007 | Rofougaran | |
| 7,200,368 B1 | 4/2007 | Hottinen et al. | |
| 7,209,096 B2 | 4/2007 | Chau | |
| 7,224,319 B2 | 5/2007 | Kubba et al. | |
| 7,256,649 B2 | 8/2007 | Ksienski et al. | |
| 7,308,020 B2 | 12/2007 | Ishii et al. | |
| 7,310,503 B2 | 12/2007 | Ido | |
| 7,345,626 B2 | 3/2008 | Smith et al. | |
| 7,366,139 B2 | 4/2008 | Poegel et al. | |
| 7,369,832 B2 | 5/2008 | Cho | |
| 7,498,993 B1 | 3/2009 | Lee et al. | |
| 7,522,899 B1 | 4/2009 | He | |
| 7,545,333 B2 | 6/2009 | Li et al. | |
| 7,564,407 B2 | 7/2009 | Yoshizoe et al. | |
| 7,596,168 B2 | 9/2009 | Saito | |
| 7,919,997 B2 | 4/2011 | Obkircher | |
| 8,036,319 B2 | 10/2011 | Arambepola et al. | |
| 8,086,203 B2 | 12/2011 | Gonikberg | |
| 8,385,868 B2 | 2/2013 | Lee et al. | |
| 8,515,378 B2 * | 8/2013 | Lee et al. ..................... | 455/296 |
| 2001/0022557 A1 * | 9/2001 | Rouphael et al. ............ | 342/367 |
| 2003/0186660 A1 | 10/2003 | Lee | |
| 2004/0130496 A1 | 7/2004 | Iijima et al. | |
| 2004/0190065 A1 | 9/2004 | Shimizu | |
| 2004/0190658 A1 | 9/2004 | Ohtaki et al. | |
| 2004/0229588 A1 | 11/2004 | Cho | |
| 2005/0117545 A1 | 6/2005 | Wittwer et al. | |
| 2006/0172710 A1 | 8/2006 | Cahana et al. | |
| 2008/0094276 A1 * | 4/2008 | Kegel ............................ | 342/354 |
| 2008/0119148 A1 | 5/2008 | Ray | |
| 2008/0129616 A1 | 6/2008 | Li et al. | |
| 2008/0238773 A1 | 10/2008 | Yoshizoe et al. | |
| 2009/0042529 A1 | 2/2009 | Lindenmeier et al. | |
| 2009/0116586 A1 | 5/2009 | Arambepola et al. | |

(56) References Cited

U.S. PATENT DOCUMENTS

2010/0317306 A1    12/2010    Lee et al.
2010/0317309 A1    12/2010    Lee et al.
2012/0108178 A1    5/2012    Lee et al.

FOREIGN PATENT DOCUMENTS

EP    1480367 A2    11/2004
JP    2004-328357 A    11/2004

OTHER PUBLICATIONS

International Search Report for Application No. PCT/US2010/038673 dated Oct. 25, 2010, 4 pages.
International Search Report for Application No. PCT/US2010/038685 dated Oct. 28, 2010, 4 pages.
International Search Report for Application No. PCT/US2010/038669 dated Oct. 26, 2010, 4 pages.
Chun-Ning Zhang et al., "A Low-Complexity Antenna Diversity Receiver Suitable for TDMA Handset Implementation", 1997, IEEE, pp. 1753-1757.

* cited by examiner

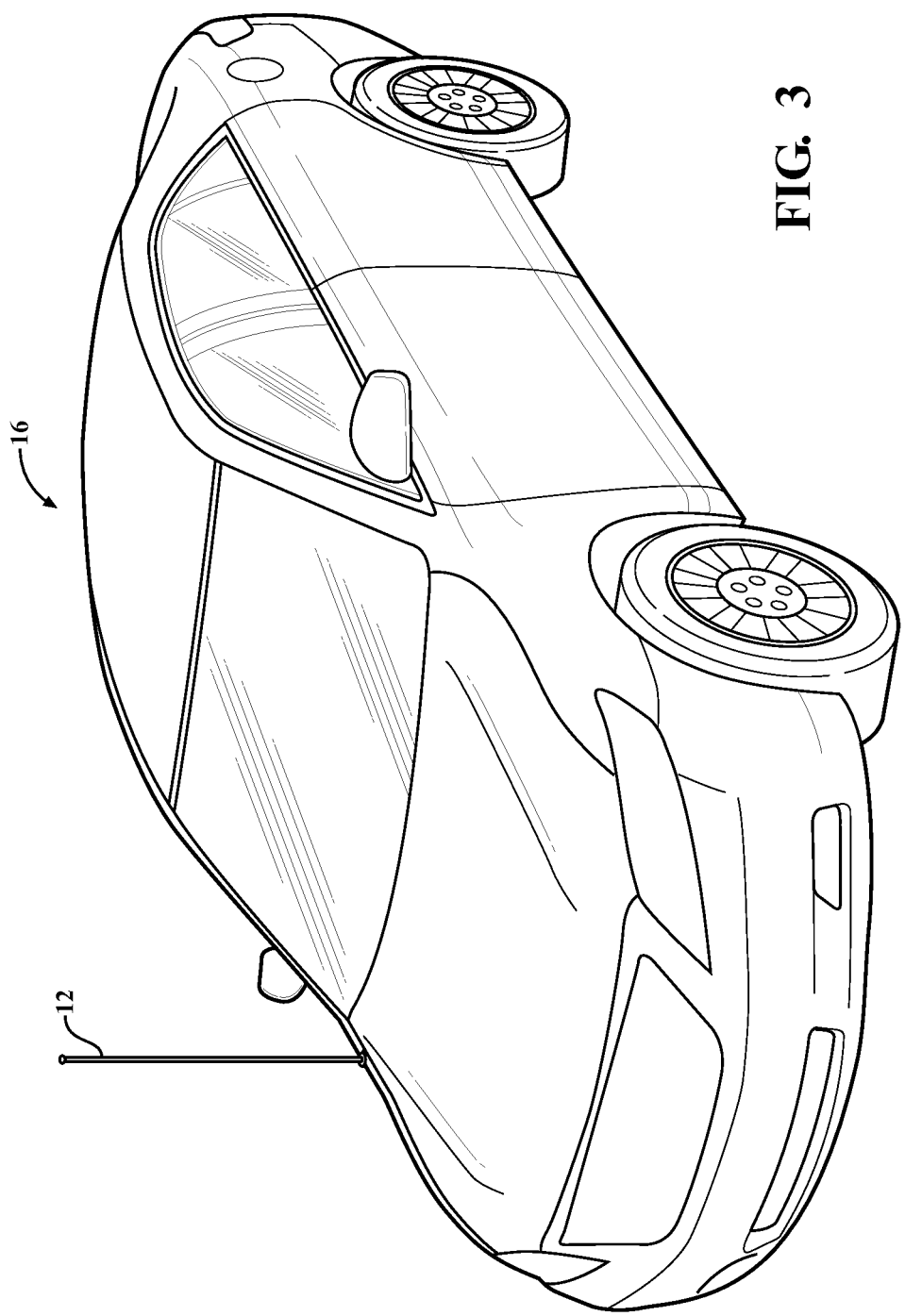

ANTENNA SYSTEM AND METHOD FOR MITIGATING MULTI-PATH EFFECT

CROSS REFERENCE TO RELATED APPLICATION

This application is a continuation application of U.S. patent application Ser. No. 12/815,833, filed on Jun. 15, 2010, which claims the benefit of U.S. Provisional Patent Application Nos. 61/268,662, 61/268,663, 61/268,665, 61/268,673, 61/268,674, and 61/268,689, each filed on Jun. 15, 2009 and each of which is hereby incorporated by reference.

BACKGROUND OF THE INVENTION

1. Field of the Invention

The application generally relates to a system and method for providing a combined antenna signal to a receiver.

2. Description of the Related Art

The use of radio frequency (RF) receivers in vehicles, such as automobiles, is commonplace. In fact, many vehicles involve multiple RF receivers for different applications. These applications include, but are not limited to, terrestrial AM radio broadcasts, terrestrial FM radio broadcasts, satellite radio broadcast (e.g., SDARS), global position system (GPS) reception, and cellular telephone reception.

One challenge in RF signal reception in vehicles is known as the "multi-path effect". This effect occurs when an RF signal is reflected off of an object, thus causing a phasing delay. The object may be a building, a mountain, or the ionosphere. Because of this reflection an antenna may receive the RF signal at two different times, i.e., in two different phases. The first phase may be received directly from the transmitting source while the second phase may be received after the RF signal is reflected off of the object. As such, the RF signal received by the antenna, and by the receiver, may be distorted.

As such, the subject disclosure provides an antenna system and method to overcome these and other deficiencies.

BRIEF SUMMARY AND ADVANTAGES

An antenna system for mitigating a multi-path effect on a radio frequency (RF) signal received by a single antenna is disclosed herein. The system provides a conditioned signal to a receiver. A splitter is electrically connectable to the antenna. The splitter splits the RF signal received by the antenna into a first non-phase shifted signal and a second non-phase shifted signal. A variable phase shifter is electrically connected to the splitter for receiving the second non-phase shifted signal. The phase shifter may phase shift the second non-phase shifted signal to produce a phase shifted signal. The system also includes a combiner having inputs electrically connected to the splitter and the variable phase shifter. The combiner receives and combines the first non-phase shifted signal and the phase shifted signal to produce the conditioned signal. A quality examiner circuit is electrically connected to an output of the combiner. The quality examiner circuit receives the conditioned signal and determines a quality of the conditioned signal. The quality examiner circuit communicates with the variable phase shifter for changing an amount of phase shift of the second non-phase shifted signal based on the quality of the conditioned signal to modify the phase shifted signal to mitigate the multi-path effect on the RF signal received by the antenna.

A method of conditioning an RF signal received by an antenna to mitigate a multi-path effect on the RF signal prior to providing a conditioned signal to a receiver is also disclosed herein. The method includes the step of splitting the RF signal received by the antenna into a first non-phase shifted signal and a second non-phase shifted signal. The phase of the second non-phase shifted signal is shifted to produce a first phase shifted signal. The first non-phase shifted signal and phase shifted signal are combined to produce a first conditioned signal. The method further includes the steps of determining and recording a quality of the first conditioned signal. The phase of the second non-phase shifted signal is then shifted to produce a second phase shifted signal different from the first phase shifted signal. The first non-phase shifted signal and the second phase shifted signal are combined to produce a second conditioned signal. The method also includes determining and recording a quality of the second conditioned signal. The quality of the first conditioned signal and the second conditioned signal are compared to determine which of the conditioned signals has a highest quality. The conditioned signal determined to have the highest quality is provided to the receiver.

By phase-shifting one branch of a split RF signal, then recombining phase shifted and non-phase shifted signals, the system and method mitigate a multi-path effect caused by reflections of the RF signal. The system and method perform well utilizing an input from just a single antenna and without numerous branch circuitry. As such, the system and method provides a cost effective technique to mitigate a multi-path effect on the RF signal especially in comparison to standard antenna diversity schemes.

BRIEF DESCRIPTION OF THE DRAWINGS

Other advantages of the disclosed subject matter will be readily appreciated, as the same becomes better understood by reference to the following detailed description when considered in connection with the accompanying drawings wherein:

FIG. 3 is a perspective view of a vehicle supporting an antenna for use with the system and method.

DETAILED DESCRIPTION

Referring to the Figures, wherein like numerals indicate like parts throughout the several views, an antenna system 10 and method is shown and described herein. The antenna system 10 and method are particularly effective for mitigating a multi-path effect on a radio frequency (RF) signal received by an antenna 12 and providing a conditioned signal to a receiver 14. However, those skilled in the art will realize other functional applications for the system 10 and method described herein. Furthermore, the method described herein may be implemented with devices other than those specific devices of the system 10.

In the illustrated embodiments, the system 10 and method are implemented in conjunction with a vehicle 16, such as an automobile, as shown in FIG. 3. However, it is appreciated that the system 10 and method may be implemented in other types of vehicles as well as non-vehicle environments. The system 10 and method described herein function well using only a single antenna 12. That is, the system 10 and method do not require multiple antennas, nor an antenna array, to achieve superior performance. However, those skilled in the art realize that the system 10 and method may alternatively be implemented with multiple antennas or an antenna array.

Figure 1:
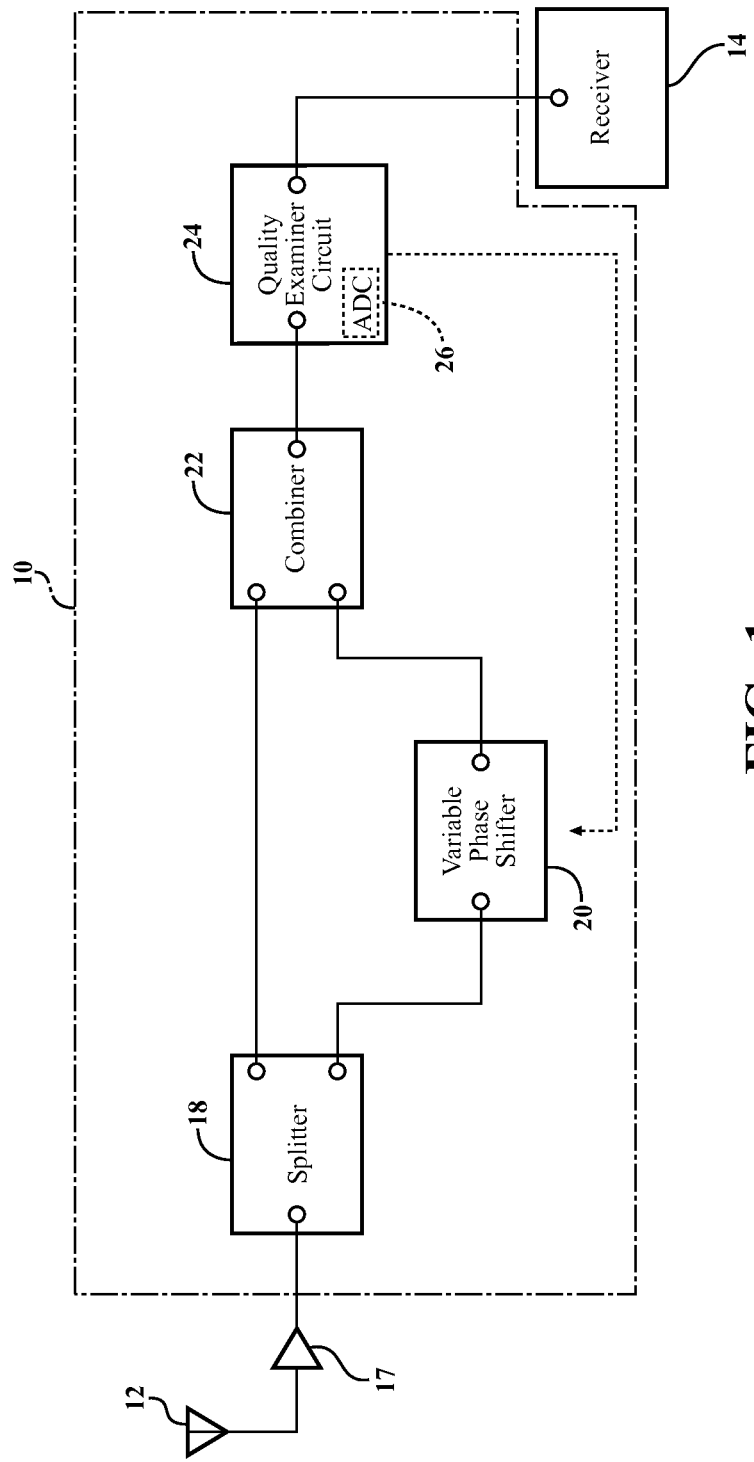
FIG. 1 is a block electrical schematic diagram of a first embodiment of an antenna system.
Figure 2:
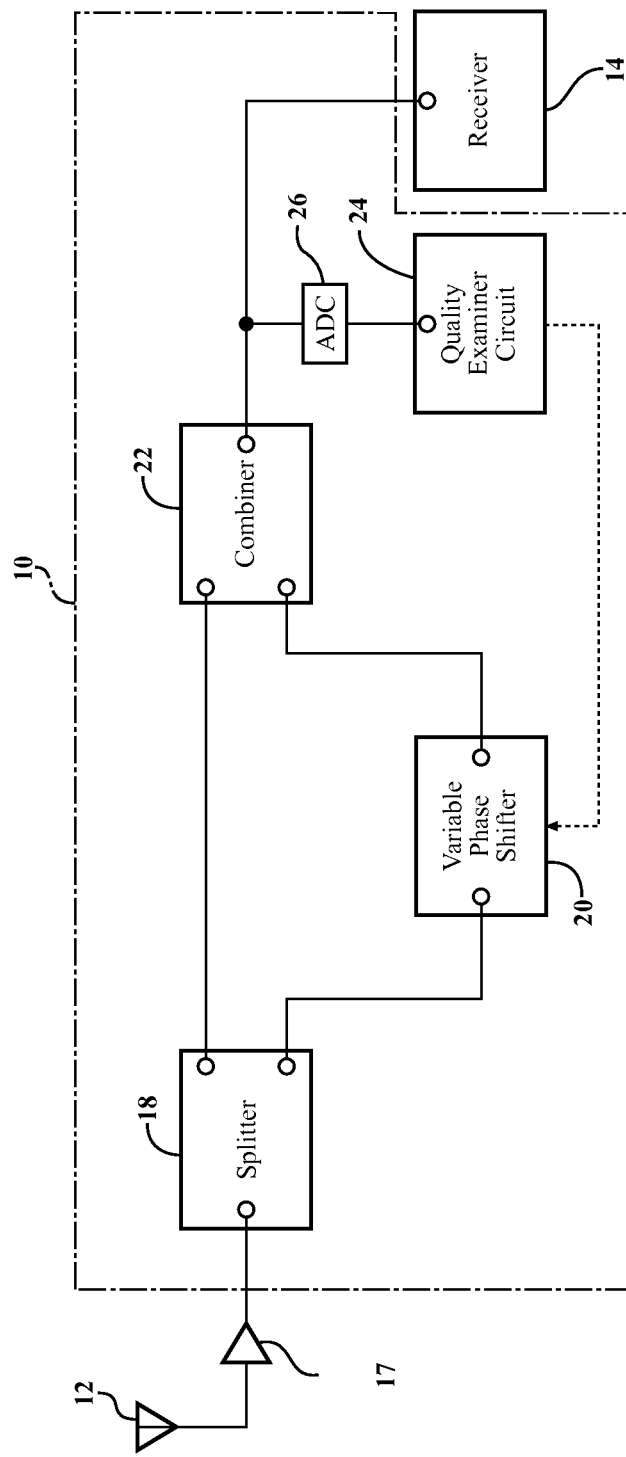
FIG. 2 is a block electrical schematic diagram of a second embodiment of the system.

Referring now to FIGS. 1 and 2, an amplifier 17 may be electrically connected to the single antenna 12 for amplifying the RF signal received at the antenna 12. This amplifier 17 may be a low-noise amplifier (LNA) as is known to those skilled in the art. The amplifier 17 is preferably disposed in close proximity to the antenna 12, or, alternatively, is disposed somewhat distant from the antenna 12.

The system 10 includes a splitter 18 electrically connectable to the antenna 12. More specifically, in the illustrated embodiment, an input of the splitter 18 is electrically connected to an output of the amplifier 17. The splitter 18 splits the RF signal received by the antenna 12 into a plurality of non-phase shifted signals. The splitter 18 of the illustrated embodiments is implemented as a "two-way splitter", i.e., the splitter 18 includes one input (not numbered) and two outputs (not numbered). As such, the splitter 18 of the illustrated embodiments splits the RF signal into a first non-phase shifted signal and a second non-phase shifted signal. The splitter 18 in the illustrated embodiments does not shift the phase of the RF signals. Instead, the splitter 18 merely splits the RF signal into multiple signals that are substantially identical to one another. However, in other embodiments (not shown), the splitter 18 may include more than two outputs to produce other non-phase shifted signals.

The splitter 18 may be implemented as a Wilkinson power divider or other suitable device. Preferably, the splitter 18 equally divides the power of the RF signal between the outputs, such that each non-phase shifted signals have about the same power level. However, those skilled in the art will realize certain situations where it may be advantageous to have differing power levels between the non-phase shifted signals.

The system 10 also includes a variable phase shifter 20 electrically connected to the splitter 18. More specifically, an input (not numbered) of the variable phase shifter 20 is electrically connected to one of the outputs of the splitter 18. In the illustrated embodiments, the variable phase shifter 20 receives the second non-phase shifted signal from the splitter 18 and may phase shift the second non-phase shifted signal to produce a phase shifted signal. In the illustrated embodiments, the amount of phase shift imposed on the second non-phase shifted signal is variable between 0 and 360 degrees. That is, the variable phase shifter 20 may impose no phase shift on the second non-phase shifted signal, thus, not changing the non-phase shifted signal in any meaningful way. Or, the variable phase shifter 20 may impose any amount of phase shift on the non-phase shifted signal, based on the technical limitations of the specific variable phase shifter 20 that is implemented. For example, the variable phase shifter 20 may be capable of shifting the phase of the RF signal by 0° (no phase shift), 2.5°, 5°, 7.5°, 10°, 12.5°, and 15°. Furthermore, those skilled in the art realize that the phase shift of a signal is analogous to a time delay of the signal.

The system 10 also includes a combiner 22 for combining signals. The combiner 22 includes inputs (not numbered) electrically connected to both the splitter 18 and the variable phase shifter 20. The combiner 22 receives and combines the first non-phase shifted signal from the splitter 18 and the phase shifted signal from the variable phase shifter 20 to produce the conditioned signal.

The system further includes a quality examiner circuit 24. The quality examiner circuit 24 is electrically connected to an output (not numbered) of the combiner 22 for receiving the conditioned signal. The quality examiner circuit 24 determines a quality of the conditioned signal and communicates with the variable phase shifter 20 for changing an amount of phase shift of the second non-phase shifted signal based on the quality of the conditioned signal. Signal quality refers to any of several aspects of a signal, including, but not limited to, high signal strength, low noise in the signal, and high signal-to-noise ratio.

The quality examiner circuit 24 may be implemented as a microprocessor (not separately numbered) operating as a digital signal processor. Those skilled in the art realize numerous suitable microprocessors to be utilized as the quality examiner circuit 24. Furthermore, those skilled in the art realize other non-microprocessor implementations for the quality examiner circuit 24.

In a first embodiment of the system 10, as shown in FIG. 1, the quality examiner circuit 24 includes an input (not numbered) for receiving the conditioned signal and an output (not numbered) electrically connectable to the receiver 14 for providing the modified signal to the receiver 14. As such, the modified signal is passed through the quality examiner circuit 24. The quality examiner circuit 24 may further modify the modified signal with digital signal processing techniques as is realized by those skilled in the art.

In a second embodiment of the system 10, as shown in FIG. 2, the output of the combiner 22 is electrically connectable to the receiver 14 for providing the conditioned signal to the receiver 14. As such, modified signal is not passed through the quality examiner circuit 24, and is not further modified by the quality examiner circuit 24.

The system 10 may also include an analog-to-digital converter (ADC) 26. The ADC 26 is electrically connected to the combiner 22 and the quality examiner circuit 24 for receiving the conditioned signal from the combiner 22 and providing a digital representation of the conditioned signal to the quality examiner circuit 24. Use of the ADC 26 is especially advantageous when either signal strength or noise are being examined as an aspect of signal quality. In the first embodiment, as shown in FIG. 1, the ADC 26 is integrated with the quality examiner circuit 24. In the second embodiment, as shown in FIG. 2, the ADC 26 is shown separate from the quality examiner circuit 24. Furthermore, those skilled in the art realize that the system 10 may be implemented without the ADC 26.

As stated above, the method of conditioning the RF signal provides a technique to mitigate a multi-path effect. The multi-path effect, as realized by those skilled in the art, occurs when an RF signal is reflected off of an object, thus causing a delay. The object may include, but is not limited to, a building, a mountain, and the ionosphere. Because of this reflection, and subsequent delay, the antenna 12 may receive the RF signal in two different phases. The first phase may be received directly from the transmitting source while the second phase may be received after the RF signal is reflected off of the object.

Particularly, to determine the best combination of phase shifted and non-phase shifted signals to make up the conditioned signal that is delivered to the receiver 14, the conditioned signal is analyzed using a plurality of different phase shifts of the phase shifted signal. The different phase shifted signals may, for convenience, be referred to as a first phase shifted signal, a second phase shifted signal, a third phase shifted signal, and so on.

In the illustrated embodiments the quality examiner circuit 24 changes the phase of the amount of phase shift provided by the variable phase shifter 20. For each different amount of phase shift, the quality examiner circuit 24 analyzes the quality of the resulting conditioned signal. The quality examiner circuit 24 then determines which of the resulting conditioned signals provides the highest quality signal and changes to the phase shift of the variable phase shifter 20 to match the phase shift of the highest quality signal. The conditioned signal is then provided to the receiver 14. Preferably, the quality examiner circuit 24 repeats this cycle only when needed, such as when the signal quality falls below a predetermined threshold. However, in other embodiments, the quality examiner circuit 24 may repeat this cycle based on other considerations.

In one particular example, the variable phase shifter 20 first produces a first phase shifted signal by phase shifting the second non-phase shifted signal by a first amount. This first phase shifted signal is combined with the first non-phase shifted signal to produce a first conditioned signal. The quality examiner circuit 24 determines and records the quality of the first conditioned signal. The variable phase shifter 20 then produces the second phase shifted signal by phase shifting the second non-phase shifted signal by a second amount, which is different than the first amount. As such, the second phase shifted signal is different from the first phase shifted signal. This second phase shifted signal is combined with the first non-phase shifted signal to produce a second conditioned signal. Accordingly, the second conditioned signal is different from the first conditioned signal. The quality examiner circuit 24 determines and records the quality of the second conditioned signal. The quality examiner circuit 24 then determines which of the first or second conditioned signals provides the highest quality signal and changes the phase shift of the variable phase shifter 20 to match the phase shift of the highest quality signal.

Of course, the method may utilize more than a first and second conditioned signal. For instance, the variable phase shifter 20 may also produce a third phase shifted signal by phase shifting the second non-phase shifted signal by a third amount, which is different than the first and second amounts. As such, the third phase shifted signal is different from the first and second phase shifted signals. This third phase shifted signal is combined with the first non-phase shifted signal to produce a third conditioned signal. Accordingly, the third conditioned signal is different from the first and second conditioned signals. The quality examiner circuit 24 determines and records the quality of the third conditioned signal. The quality examiner circuit 24 then determines which of the first, second, or third conditioned signals provides the highest quality signal and changes the phase shift of the variable phase shifter 20 to match the phase shift of the highest quality signal.

Thus, the method provides a cost effective technique to mitigate a multi-path effect on the RF signal, especially in comparison to antenna diversity schemes, where multiple antennas are required. Accordingly, the system 10 also provides a cost effective technique to mitigate a multi-path effect on the RF signal when the quality examiner circuit 24 is properly programmed to execute the method described herein.

The present invention has been described herein in an illustrative manner, and it is to be understood that the terminology which has been used is intended to be in the nature of words of description rather than of limitation. Obviously, many modifications and variations of the invention are possible in light of the above teachings. The invention may be practiced otherwise than as specifically described within the scope of the appended claims.

What is claimed is:

1. An antenna system for mitigating a multi-path effect on a radio frequency (RF) signal received by a single antenna and for providing a conditioned signal to a receiver, said system comprising:
   a splitter electrically connectable to the single antenna wherein said splitter splits the RF signal received by the single antenna into a first non-phase shifted signal and a second non-phase shifted signal;
   a variable phase shifter electrically connected to said splitter for receiving the second non-phase shifted signal, wherein said phase shifter phase shifts the second non-phase shifted signal to produce a first phase shifted signal and a second phase shifted signal that is different from the first phase shifted signal;
   a combiner having inputs electrically connected to said splitter and said variable phase shifter, said combiner receives and combines the first non-phase shifted signal and the first phase shifted signal to produce a first conditioned signal, and said combiner receives and combines the first non-phase shifted signal and the second phase shifted signal to produce a second conditioned signal; and
   a quality examiner circuit electrically connected to an output of said combiner to receive the first and second conditioned signals, with said quality examiner circuit configured to determine which of the conditioned signals has a highest quality, and wherein said quality examiner circuit provides the one of the first and second conditioned signals determined to have the highest quality to the receiver.

2. A system as set forth in claim 1 wherein said quality examiner circuit is further defined as a microprocessor.

3. A system as set forth in claim 1 wherein said variable phase shifter shifts the phase of the second non-phase shifted signal to a phase shift associated with the one of the first and second conditioned signals determined to have the highest quality.

4. A system as set forth in claim 1 wherein said variable phase shifter may phase shift the second non-phase shifted signal to produce a third phase shifted signal different from the first and second phase shifted signals.

5. A system as set forth in claim 4 wherein said combiner receives and combines the first non-phase shifted signal and the third phase shifted signal to produce a third conditioned signal.

6. A system as set forth in claim 5 wherein said quality examiner circuit determines and records a quality of the third conditioned signal.

7. A system as set forth in claim 6 wherein said quality examiner circuit compares the quality of the first, second, and third conditioned signals to determine which of the conditioned signals has a highest quality.

8. A system as set forth in claim 7 wherein said quality examiner circuit provides the one of the first, second, and third conditioned signals determined to have the highest quality to the receiver.

9. A system as set forth in claim 8 wherein said variable phase shifter shifts the phase of the second non-phase shifted signal to a phase shift associated with the one of the first, second, and third conditioned signals determined to have the highest quality.

10. A system as set forth in claim 1 further comprising an analog-to-digital converter (ADC) electrically connected to said combiner and said quality examiner circuit for receiving the conditioned signal from said combiner and providing a digital representation of the conditioned signal to said quality examiner circuit.

11. A system as set forth in claim 1 wherein signal quality is further defined as signal strength.

12. A system as set forth in claim 1 wherein said quality examiner circuit includes an input for receiving the conditioned signal and an output electrically connected to the receiver for providing the conditioned signal to the receiver.

13. A system as set forth in claim 1 wherein said output of said combiner is electrically connected to the receiver for providing the conditioned signal to the receiver.

14. A system as set forth in claim 1 wherein said quality examiner communicates the quality of at least one of the first and second conditioned signals to said variable phase shifter.

15. A system as set forth in claim 14 wherein said variable phase shifter changes the amount of phase shift of the second non-phase shifted signal based on the quality of at least one of the first and second conditioned signals.

* * * * *